United States Patent
Wiegert

(10) Patent No.: US 6,237,557 B1
(45) Date of Patent: May 29, 2001

(54) INTEGRATED PUSH ROD LOCATOR IN CYLINDER HEAD GASKET

(75) Inventor: Joel Edmund Wiegert, Glen Ellyn, IL (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/560,786

(22) Filed: Apr. 28, 2000

(51) Int. Cl.⁷ .................................................. F16J 15/12
(52) U.S. Cl. .................................. 123/193.5; 277/595
(58) Field of Search .................... 277/591–606; 123/193.5

(56) References Cited

U.S. PATENT DOCUMENTS

| | | |
|---|---|---|
| 4,754,982 * | 7/1988 | Udagawa et al. ............... 277/595 |
| 4,861,047 * | 8/1989 | Okano ............................ 277/591 |
| 5,096,325 | 3/1992 | Udagawa . |
| 5,105,777 | 4/1992 | Kronich et al. . |
| 5,170,927 * | 12/1992 | Udagawa et al. ............... 277/595 |
| 5,211,408 | 5/1993 | Udagawa . |
| 5,221,097 | 6/1993 | Ishikawa et al. . |
| 5,269,541 | 12/1993 | Inamura . |
| 5,280,929 | 1/1994 | Miyaoh et al. . |
| 5,316,322 * | 5/1994 | Udagawa et al. ............... 277/595 |
| 5,395,128 | 3/1995 | Udagawa . |
| 5,895,054 | 4/1999 | Miyaoh et al. . |
| 5,906,376 | 5/1999 | Udagawa et al. . |

* cited by examiner

Primary Examiner—Marguerite McMahon
(74) Attorney, Agent, or Firm—Rader, Fishman & Grauer PLLC

(57) ABSTRACT

A cylinder head gasket is installed on an engine block having a single push rod cavity that includes a generally rectangular opening defining opposing long and short edges. The rectangular opening is bridged by a plurality of material strips parallel to the short edges and connected at each end to the opposed long edges. Each strip includes a hole adapted to receive and support a push rod prior to assembly of the cylinder block to the head.

14 Claims, 2 Drawing Sheets

US 6,237,557 B1

INTEGRATED PUSH ROD LOCATOR IN CYLINDER HEAD GASKET

FIELD OF THE INVENTION

The present invention relates generally to a head gasket for an overhead valve internal combustion engine, and more particularly, to a head gasket that assists in locating valve push rods during assembly.

BACKGROUND OF THE INVENTION

Overhead valve internal combustion engines include a cylinder block portion and a cylinder head which are bolted together. The cylinder block includes at least one cylinder bore opening to an end face and a push rod cavity spaced from and generally parallel to the cylinder bore and opening to the end face of the cylinder block. The cylinder head includes a corresponding number of combustion chambers forming the top of the cylinder bores, at least one intake valve and exhaust valve allowing communication of each combustion chamber with intake and exhaust ports, respectively, valve springs, rocker arms, and a push rod cavity. The combustion chamber and push rod cavity of the cylinder head open to an end face in alignment with their counterparts in the cylinder block. A gasket is provided between the end faces of the cylinder block and the cylinder head to seal the interface therebetween.

In some engine designs, the push rod cavity is a large rectangular cavity that houses multiple overhead valve push rods. In designs utilizing multiple intake and exhaust valves per cylinder, a single push rod is generally used to actuate multiple valves. Thus, each cylinder bore typically is associated with two push rods, one each to actuate intake and exhaust valves. In engines having up to four cylinder bores per cylinder block and head, such as in V-8 engines, the rectangular push rod cavity must be large enough to house up to eight push rods in close relation to the chambers.

In such engines, assembly of the cylinder block and cylinder head may be problematic due to the push rod locations within the push rod cavity. In a typical assembly, the push rods are inserted into the cylinder block after attaching the cylinder head thereto, and are allowed to "float" within the push rod cavity until later attachment to rocker arm assemblies. After head attachment, the push rod must then be aligned and interconnected with the rocker arm assemblies attached to the cylinder head, as well as to the cam following of the camshaft, typically requiring extra assembly time. However, in overhead valve internal combustion engines, the rocker arm of the valve mechanism is located at a relatively great distance from the cam shaft, requiring a relatively long push rod connecting the cam of the cam shaft to the rocker arm of the valve lifter. Since each push rod may be on the order of one and one-half feet long, alignment of the push rods during assembly may be difficult, requiring extra manufacture time and effort, thereby increasing assembly difficulty and cost.

However, as noted above, a gasket is provided between the end faces of the cylinder block and the cylinder head to seal the interface therebetween. The gasket includes a rectangularly shaped cutout to surround the push rod cavity. It is known to provide discrete holes through a gasket sized and shaped to receive individual push rods, or to support the push rod from laterally deflecting during reciprocation thereof by providing tabs that extend into the push rod cavity hole and also extend upwardly out of the gasket plane. However, use of individual holes is not practical for engines having a relatively large rectangular push rod cavity, since the cavity allows lubricant to flow from the engine head to the camshaft, push rod cam follower, and camshaft bearings. Moreover, in larger multi-cylinder engines, push rod lateral deflection is minimized by increasing the size of the push rod itself. Additionally, in known designs supporting the push rod, only lateral movement of the push rods perpendicular to the rocking plane of the rocker arms is restricted while lateral movement of the push rods in the rocking plane of the rocker arms incidental to the rocking motion of the rocker arms is permitted. Since only partial lateral support is provided to the push rod, and only during push rod reciprocation during engine operation, the design does not assist in locating the push rod for assembly, and instead allows significant movement of an unsecured push rod prior to assembly. It is therefore desirable to incorporate features onto the gasket that assist in locating and retaining the push rods prior to engine assembly to simplify the assembly of the cylinder head to the cylinder block, while still allowing the push rods to be retained within a large, rectangular cavity.

SUMMARY OF THE INVENTION

The invention is directed to a cylinder head gasket that is installed on an engine block. The gasket includes a generally rectangular cutout portion for surrounding a push rod cavity, the cutout defining opposing long and short edges. The cutout portion is bridged by a plurality of material strips parallel to the short edges and connected at each end to the opposed long edges. Each strip includes a hole adapted to receive and support a push rod prior to assembly of the cylinder block to the head.

The strip with its corresponding hole serves to locate and retain a push rod in a proper position to facilitate easy assembly of a cylinder head to a cylinder block. In particular, the present invention locates and retains a push rod in its proper place before attaching the cylinder head, instead of after attaching the cylinder head. Additionally, the gasket of the present invention allow a rocker arm carrier and cylinder head to be assembled together before they are assembled to the engine block. Final assembly of the engine is therefore limited only to attaching the cylinder head to the block, thereby reducing assembly complexity and time requirements.

BRIEF DESCRIPTION OF DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
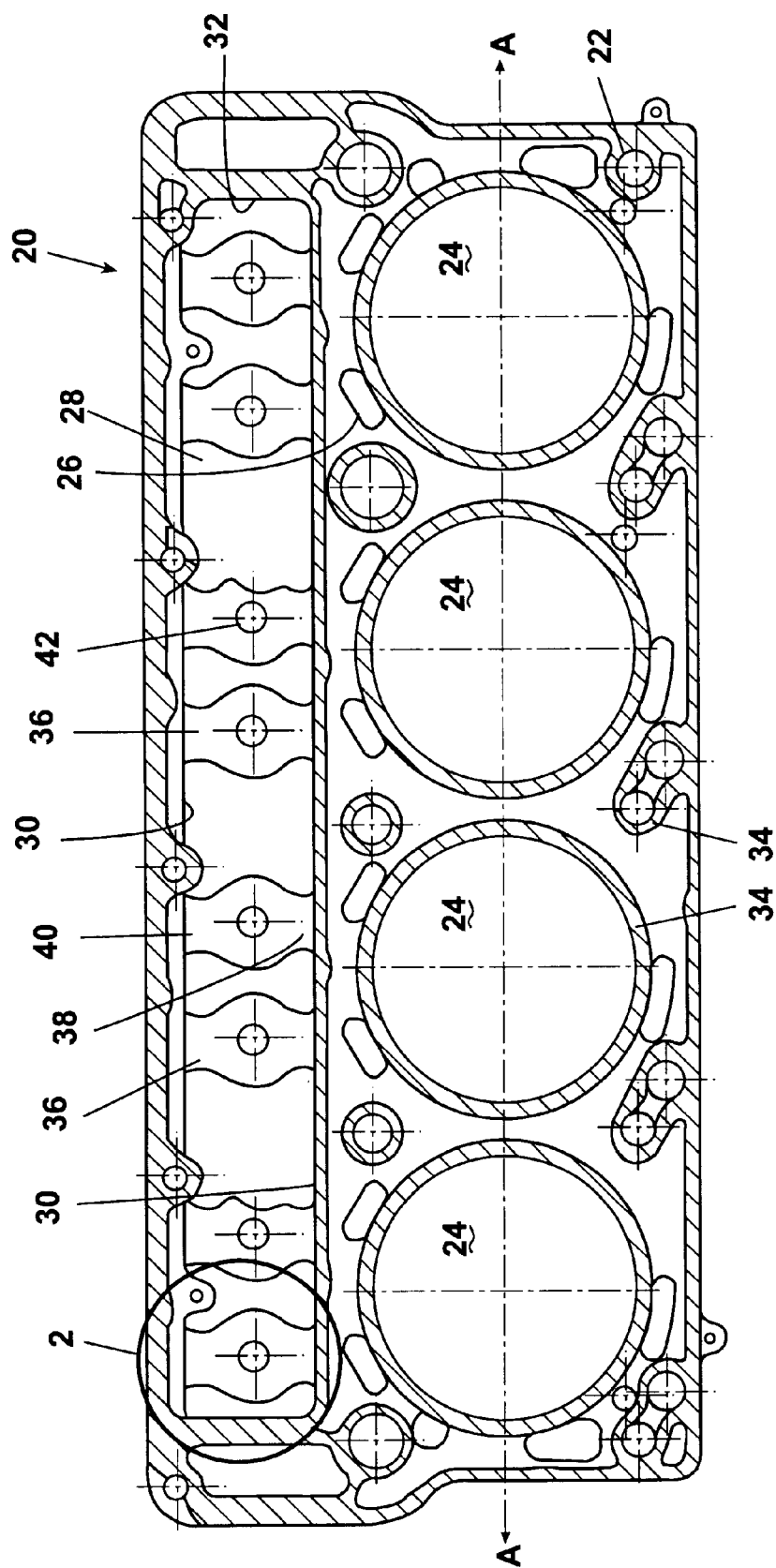
FIG. 1 is a top plan view of a gasket according to the present invention.

FIG. 1 shows a gasket 20 for use with an internal combustion engine. Gasket 20 has a plurality of bolt holes 22 and first apertures 24 that are adapted to mate with cylinder bores of an engine block. Preferably, gasket 20 is also provided with second apertures 26 that serve as fluid flow openings for engine coolant and the like. Additionally, gasket 20 includes a large, generally rectangularly shaped opening 28 sized and shaped to fit around a push rod cavity (not shown). Push rod opening 28 is defined by two opposed long edges 30 extending in a direction generally parallel to the axis A—A of the cylinder bores 24, and two opposed short edges 32 interconnecting the long edges together to form a generally rectangular shape. Gasket 20 further includes a plurality of sealing embossments 34 provided at conventional locations about apertures 24, 26. Embossments 34 may be of any conventional size and shape, and are designed to prevent leaks when the engine is assembled.

Prior to assembly of a cylinder block to a cylinder head, the gasket 20 is appropriately located on the bore. Push rods (not shown) are then inserted into the push rod cavity through the push rod opening 28. In conventional gasket designs, the push rods are not inserted within opening 28 until attachment of the cylinder head. In such a case, the push rod is inserted between a cam follower near a camshaft and a corresponding rocker arm within the cylinder head. However, the present invention allows installation of the push rod, including attachment to the cam follower, prior to attaching the cylinder head. To assist in locating the push rods in place prior to attaching the cylinder head, gasket 20 is provided with a plurality of bridges 36, each one designed to receive and locate a push rod in place. Bridges 36 are attached to an outer periphery of the push rod opening 28. As seen in FIG. 1, each cylinder bore 24 is associated with two push rod support bridges 36, one each for an intake and an exhaust valve push rod. Each bridge 36 includes first and second ends 38, 40 respectively attached to opposing long edges 30 of opening 28. Additionally, each bridge 36 includes a push rod locator hole 42 for receiving a push rod therethrough.

Locator holes 42 are preferably aligned in a row parallel to axis A—A, and are precisely located to guide push rod insertion and to support the push rod in the appropriate location for engine assembly. To assist with push rod insertion, locator holes 42 may include one or more slits 44 (FIG. 2) extending radially therefrom to allow the hole to enlarge in response to insertion of a push rod. In this way, a tight fit between the push rod and the bridge may be obtained, thereby locking the push rod in place. However, locator holes 42 are preferably sized and shaped to closely conform to the outer surface of the push rod without deforming as the push rod is inserted, while allowing a small amount of clearance between the aperture inner edge 48 to allow push rod reciprocation during engine operation.

Figure 2:
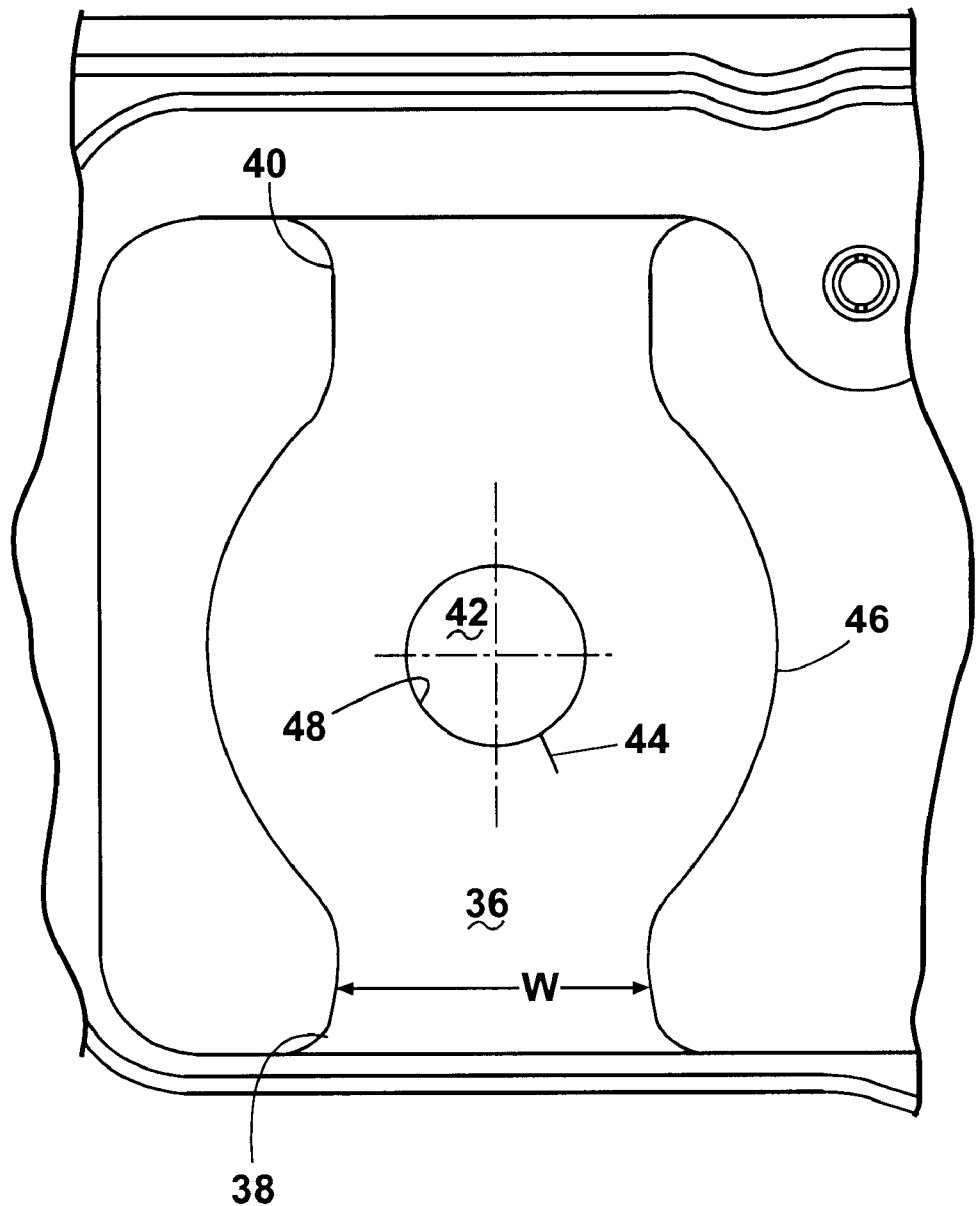
FIG. 2 is a detailed view of circle 2 of FIG. 1.

As best seen in FIG. 2, bridges 36 preferably have a generally circular outer contour 46 intermediate ends 38, 40 to provide sufficient support for an inserted push rod. Additionally, ends 38, 40 have a width W sufficiently large to prevent breaking or tearing of the bridge during push rod assembly. However, since bridges 36 are designed only to support the push rod prior to assembling an engine cylinder block to an engine head, the size and shape of each bridge 36 need only be sufficient to maintain the location of each push rod within acceptable tolerances. Accordingly, bridges 36, and especially the portion of bridges 36 surrounding locator holes 42, must be strong enough to support the push rod only until assembly of the engine.

Gasket 20 is shown in FIGS. 1 and 2 as a multiple layer steel gasket, but could be formed from any conventional gasket material. However, the present invention is particularly suited to multiple layer metallic gaskets because only one of the layers need include the bridges 36. Specifically, if the gasket if formed of two outer layers and an internal layer, only one of the layers need be stamped with the bridges 36, while the other two layers may include only the outer periphery of the push rod opening.

Once the push rod is inserted through locator holes 42, it may be immediately assembled to a cam follower within the engine block. Since the locator holes 42 are precisely located on bridges 36, errors in push rod location are eliminated. Importantly, rocker arm carriers and rocker arms that interact with the push rod may be assembled directly to the cylinder head prior to engine assembly rather than after, since the location of the push rod end that interacts with the rocker arm is known to be correct. Moreover, since the rocker arm carriers may be pre-installed into the cylinder head, the head may be assembled and manufactured at a location remote from the cylinder block. Thus, the gasket of the present invention simplifies engine manufacture and assembly, requiring only that the head be bolted to the block to complete assembly without requiring additional time to fit the rocker arm to the push rod.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. In an overhead valve internal combustion engine having a single push rod cavity housing a first plurality of push rods, gasket for sealing between a cylinder block and a cylinder head of the engine, comprising:
    a push rod opening corresponding in size and shape to the push rod cavity; and
    a plurality of bridges spanning said push rod opening corresponding to the first plurality of push rods, said bridges each including a locator hole for receiving a push rod therethrough and locating the push rod relative to the push rod cavity.

2. The gasket of claim 1, wherein opposing ends of each bridge are secured to an outer periphery of said push rod opening.

3. The gasket of claim 2, wherein said bridges are integral to said outer periphery.

4. The gasket of claim 1, wherein said push rod opening is generally rectangular having opposing long and short edges, said bridges having first and second ends respectively attached to said long edges such that said bridges are parallel to said short end.

5. The gasket of claim 2, wherein said locator holes are sized and shaped to closely conform to the outer surface of the push rod while allowing a small amount of clearance between an inner edge of said holes and the push rod outer surface.

6. The gasket of claim 2, wherein at least one said locator hole has an inner periphery and further includes a slit radially extending out from said inner periphery to allow said hole to enlarge in response to insertion of a push rod.

7. The gasket of claim 6, wherein the gasket is a metallic gasket having more than one layer.

8. The gasket of claim 6, wherein only one of said multiple layer metallic gasket layers includes said bridges.

9. The gasket of claim 6, wherein each said bridge includes a generally circular outer contour intermediate said first and second ends.

10. The gasket of claim 6, wherein the gasket is a multiple layer metallic gasket.

11. A gasket comprising:
    a first plurality of bolt holes;
    a second plurality of apertures adapted to mate with cylinder bores of an engine block;
    a third plurality of fluid flow openings for engine coolant and the like; and a generally rectangularly shaped push rod opening adapted to mate with a push rod cavity, said opening including a fourth plurality of bridges spanning said push rod opening corresponding to the first plurality of push rods, said bridges each including a locator hole for receiving a push rod therethrough and locating the push rod relative to the push rod cavity.

12. The gasket of claim 11, wherein said rectangularly shaped push rod opening includes two opposing long edges and two opposing short edges, said bridges having first and second ends respectively attached to said long edges such that said bridges are parallel to said short end.

13. The gasket of claim 12, wherein said locator holes are sized and shaped to closely conform to the outer surface of the push rod while allowing a small amount of clearance between an inner edge of said holes and the push rod outer surface.

14. A method of forming a metallic gasket having multiple layers, comprising:

stamping in at least one layer of the metallic gasket a generally rectangularly shaped push rod opening adapted to mate with a push rod cavity, said opening including a plurality of bridges spanning said push rod opening corresponding to the first plurality of push rods, said bridges each including a locator hole for receiving a push rod therethrough and locating the push rod relative to the push rod cavity.

* * * * *